(12) United States Patent
Kitamura et al.

(10) Patent No.: US 7,116,359 B2
(45) Date of Patent: Oct. 3, 2006

(54) IMAGE CAPTURE DEVICE AND METHOD OF CONTROLLING BLUR IN CAPTURED IMAGES

(75) Inventors: Masahiro Kitamura, Sakai (JP); Kazuchika Sato, Kobe (JP); Noriyuki Okisu, Osakasayama (JP); Mutsuhiro Yamanaka, Suita (JP); Yuji Adachi, Sakai (JP); Keiji Tamai, Suita (JP)

(73) Assignee: Minolta Co., Ltd., Osaka (JP)

( * ) Notice: Subject to any disclaimer, the term of this patent is extended or adjusted under 35 U.S.C. 154(b) by 550 days.

(21) Appl. No.: 09/999,487

(22) Filed: Nov. 15, 2001

(65) Prior Publication Data

US 2002/0060739 A1    May 23, 2002

(30) Foreign Application Priority Data

Nov. 17, 2000    (JP)    ............................. 2000-350590

(51) Int. Cl.
*H04N 5/228* (2006.01)
*H04N 5/262* (2006.01)
(52) U.S. Cl. ................................................. 348/222.1
(58) Field of Classification Search ................
348/208.99–208.16, 222.1, 239
See application file for complete search history.

(56) References Cited

U.S. PATENT DOCUMENTS

| | | | | |
|---|---|---|---|---|
| 5,124,842 A | | 6/1992 | Honda et al. ................ | 359/561 |
| 5,153,730 A | * | 10/1992 | Nagasaki et al. ......... | 348/231.6 |
| 5,172,236 A | * | 12/1992 | Takemoto et al. .......... | 348/355 |
| 6,057,935 A | * | 5/2000 | Freeman ..................... | 358/1.9 |
| 6,320,979 B1 | * | 11/2001 | Melen ......................... | 382/154 |
| 6,323,934 B1 | * | 11/2001 | Enomoto .................... | 355/40 |
| 2001/0013895 A1 | * | 8/2001 | Aizawa et al. .............. | 348/222 |

FOREIGN PATENT DOCUMENTS

JP    10-108057 A    4/1998

OTHER PUBLICATIONS

"*Arbitrarily Focused Image Acquisition by Using Multiple Differently Focused Images*", Image Information Media Society; by Kazuya Kodama, Takayuki Ohnishi, Kiyoharu Aizawa, and Mitsutoshi Hatori, vol. 51, No. 12, pp. 2072-2081 (1997).

* cited by examiner

*Primary Examiner*—Tuan Ho
*Assistant Examiner*—Timothy J. Henn
(74) *Attorney, Agent, or Firm*—Sidley Austin LLP

(57)    ABSTRACT

An image acquired by an image sensor is recorded, and the blur amount of the recorded image is changed in accordance with a blur amount determined beforehand.

15 Claims, 8 Drawing Sheets

(a)

(b)

(c)

(d)

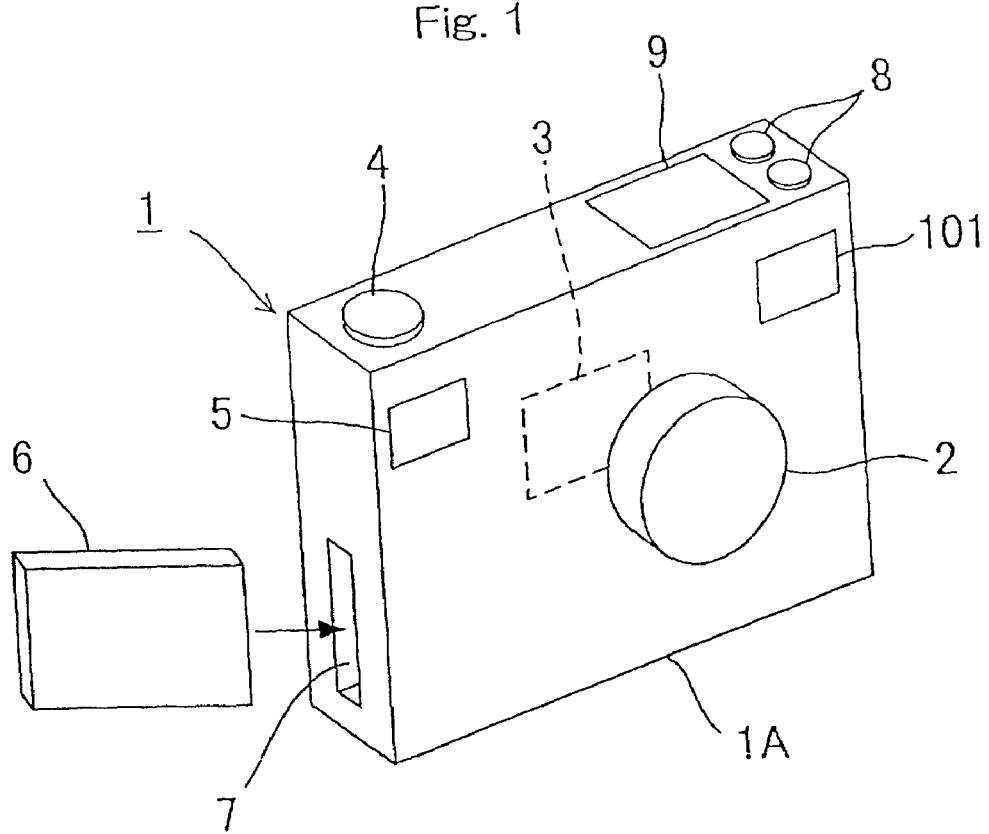
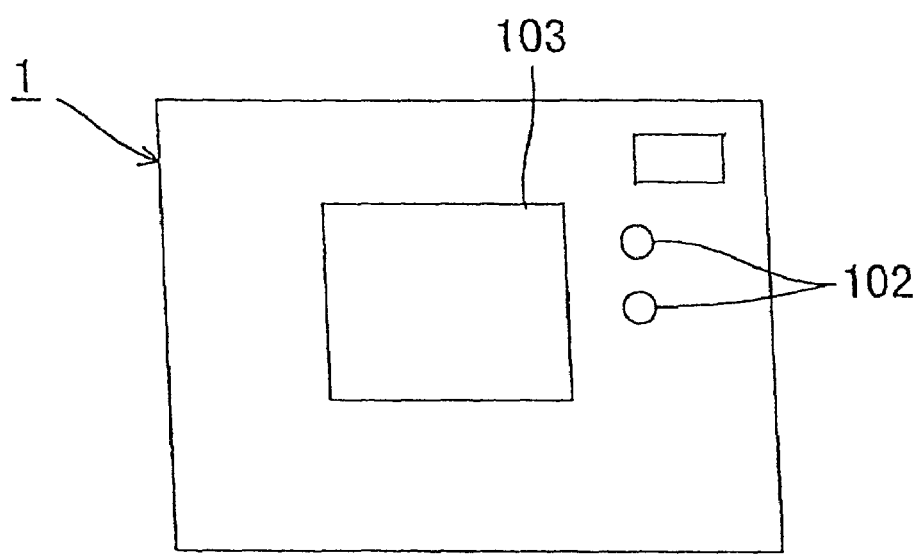

Fig. 9
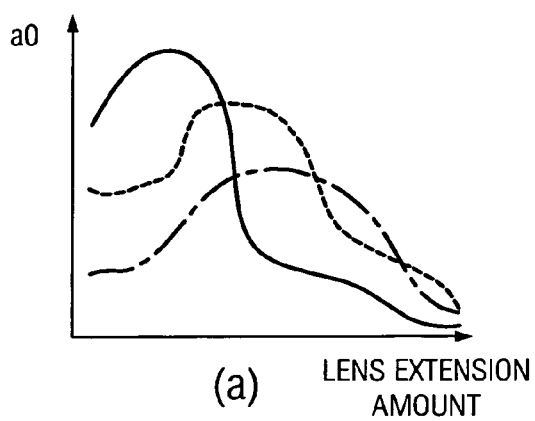
(a) LENS EXTENSION AMOUNT
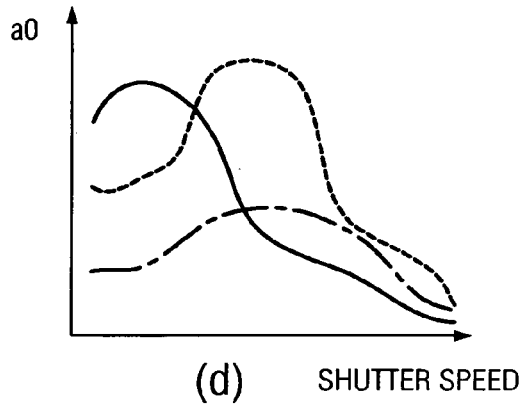
(d) SHUTTER SPEED
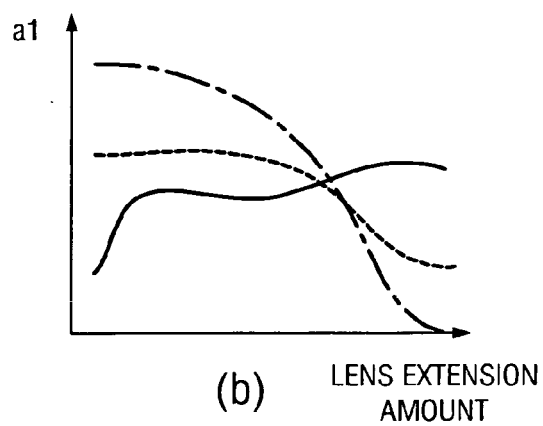
(b) LENS EXTENSION AMOUNT
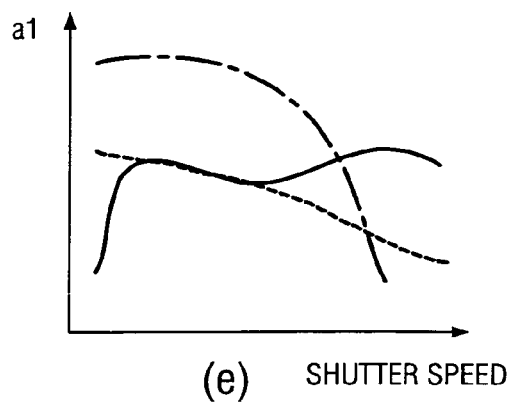
(e) SHUTTER SPEED
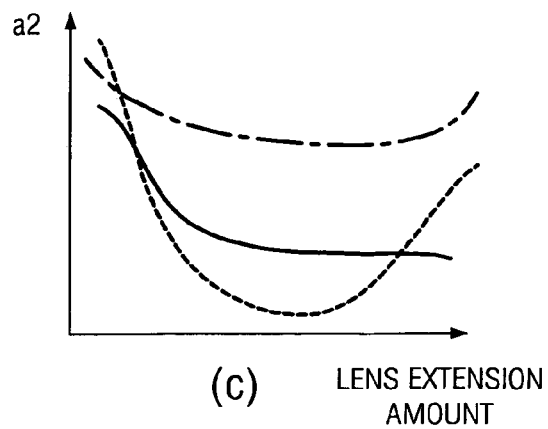
(c) LENS EXTENSION AMOUNT
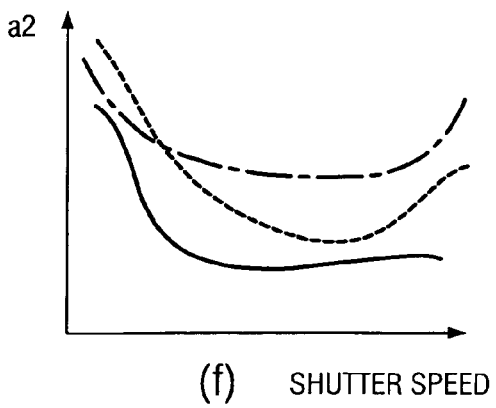
(f) SHUTTER SPEED

IMAGE CAPTURE DEVICE AND METHOD OF CONTROLLING BLUR IN CAPTURED IMAGES

This application is based on Patent Application No. 2000-350590 filed in Japan, the content of which is hereby incorporated by reference.

BACKGROUND OF THE INVENTION

1. Field of the Invention

The present invention relates to an image capture device such as a digital camera and the like, and a method of image processing.

2. Description of the Related Art

Digital cameras are known to have functions for acquiring a plurality of images of different focal lengths focused, for example, in the foreground and background, and generating a pan-focus image focused on a plurality of objects from these plurality of images, or generating a blur control image adjusted for the blur condition of objects of the foreground and background.

This blur control principle is disclosed, for example, by Kodama, Ohnishi, Aizawa, and Hattori in "Arbitrary focused image acquisition by using multiple differently focused image," Image Information Media society; VOL. 51, No. 12, pp. 2072–2081 (1997).

In this related art publication, however, only the principle of controlling the blur condition using the amount of blur relative to the amount of lens extension is disclosed, and the freedom of selection of the blur condition is low. That is, a blur condition set by a user is limited by the installed lens. Alternatively, there are limitations such as the inability to take a photograph which exceeds the stop and shutter speed restricted by the camera structure.

In view of the aforesaid facts, an object of the present invention is to provide an image capture device and a method of image processing which increase the freedom of setting the blur condition when generating a blur control image.

SUMMARY OF THE INVENTION

The image capture device attaining these objects comprises an image sensor for capturing an object image and generating an image data; a first memory for storing the image data generated by the image sensor; a second memory for storing a predetermined blur amount; and an image processor for changing a blur condition of the image data stored in the first memory according to the blur amount stored in the second memory.

BRIEF DESCRIPTION OF THE DRAWINGS

In the following description, like parts are designated by like reference numbers throughout the several drawings.

FIG. 1 is an exterior perspective view showing a digital camera using an embodiment of the image capture device of the present invention;

FIG. 2 shows the back side of the digital camera;

FIG. 9 illustrates the relationship between parameters representing the blur form and the lens extension amount and shutter speed.

DETAILED DESCRIPTION OF THE PREFERRED EMBODIMENTS

Figure 3:
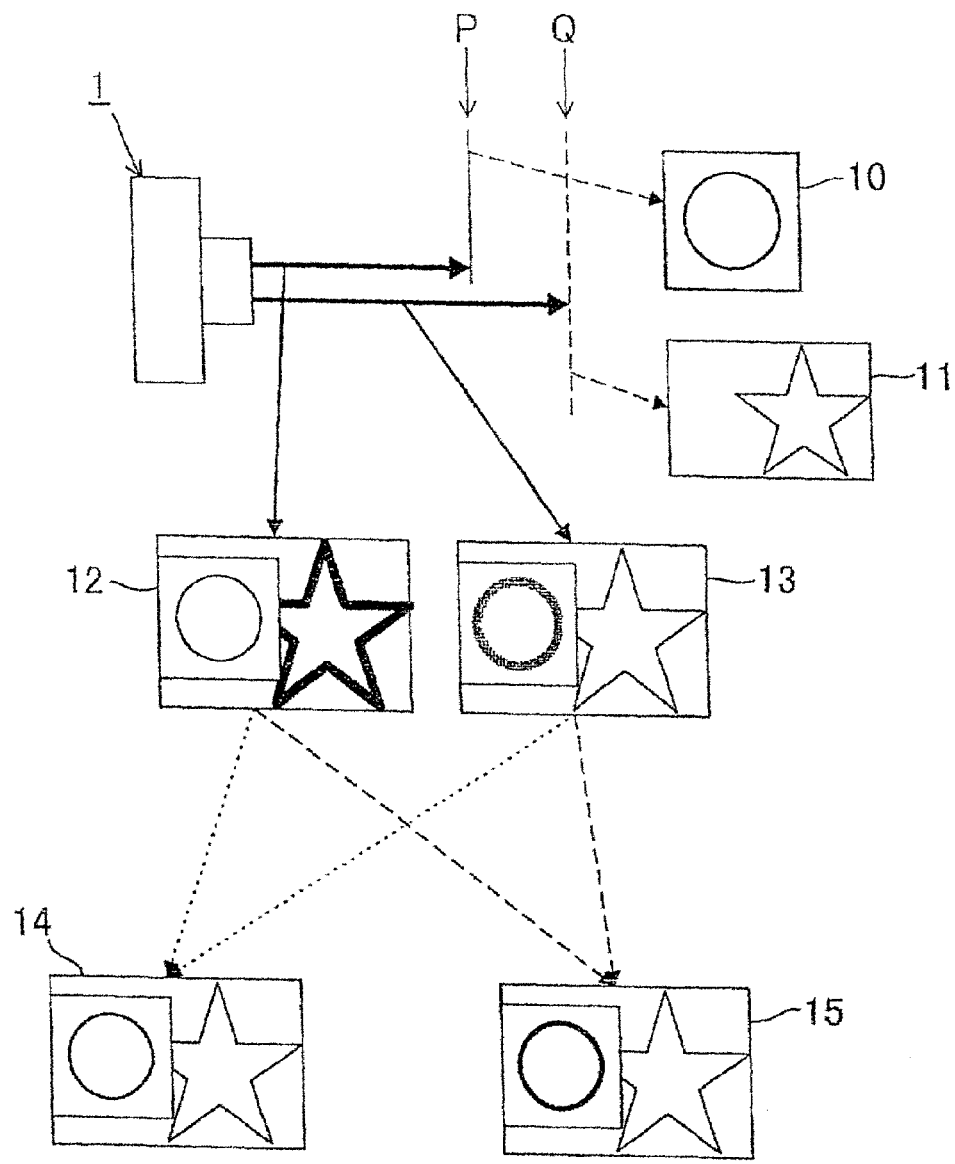
FIG. 3 illustrates the image combining process.

The embodiments of the present invention are described hereinafter.

FIGS. 1 and 2 are exterior perspective view and back side view of a digital camera using an embodiment of the image capture device of the present invention.

In FIGS. 1 and 2, reference number 1 refers to a digital camera; the front side of the camera body 1A is provided with a taking lens 2, finder window 5, and rangefinder window 101. Within the camera body 1A is provided a CCD 3 arranged on the optical path of the taking lens 2, and this is an example of an image sensing element for photoelectric conversion of a photographed optical image. A stop ring 49 is disposed at the base end of the taking lens 2, and it is possible to set the stop manually, in addition to automatic stop setting. On the top of the camera body 1A is provided a release (shutter) button 4, photographic mode setting key 8, and liquid crystal display panel 9. In the drawing, reference number 6 refers to a recording medium for recording image data, and reference number 7 refers to a recording media loading slot formed on the side surface of the camera body 1A.

The photographic mode setting key 8 is used when the photographer sets the exposure conditions such as the stop priority and shutter speed priority and the like while viewing the liquid crystal display panel 9, and when changing to macro photography, setting the zoom and the like.

on the back side of the camera body 1A is provided an image processing mode setting key 102, and a liquid crystal monitor 102 as a viewfinder, as shown in FIG. 2. The image processing mode setting key 102 is used when the photographer sets the composite image mode for generating a pan-focus image and blur control image while viewing the liquid crystal monitor 103, and sets the blur condition.

Similar to a normal camera, in addition to a capability of recording image data acquired by the CCD 3 on the recording medium 6, the digital camera 1 has a function for generating a pan-focus image from a plurality of images having different focal lengths, and a blur control function for generating a blur control image. The blur control function for generating a blur control image is actuated by operating the image processing mode setting key 8 to set the blur control mode.

FIG. 3 illustrates the operation condition of the digital camera 1 in the blur control mode. This drawing shows a competing-perspectives scene, wherein objects 10 and 11 are present on the P surface and Q surface, respectively. To simplify the description, the objects 10 and 11 are flat charts. An image 12 is acquired by focusing on the P surface, and the circle symbol of the foreground chart 10 is sharply photographed, whereas the star symbol of the background chart 11 is photographed blurred. On the other hand, an image 13 is acquired by focusing on the Q surface, and the circle symbol of the foreground chart 10 is photographed blurred, whereas the star symbol of the background chart 11 is photographed sharply.

In the composite image mode, images 14 and 15 are generated from the two images 12 and 13. The image 14 is a so-called pan-focus image, wherein both objects 10 and 11 are focused. On the other hand, the image 15 is a blur control image, wherein the background chart 11 is focused, and the blur condition of the foreground chart 10 is emphasized more than the image 12.

In this way, in the digital camera 1, a pan-focus image is obtained from a plurality of images of two or more images of the same scene photographed by changing the focus surface (focal position), and a blur control image is obtained by optionally changing the blur condition of either the foreground or background.

Since this blur control principle is disclosed, for example, by Kodama, Ohnishi, Aizawa, and Hattori in "Arbitrary focused image acquisition by using multiple differently focused image," Image Information Media society; VOL. 51, No. 12, pp. 2072–2081 (1997), further description of the principle is omitted.

Although the distance distribution of objects are described by two photographed images of a foreground and a background in the above description, three images of a foreground, background and intermediate position, or even more images may be used.

The image processing mode setting key 102 may be used when using the function for generating the pan-focus image and blur control image.

When the composite image mode is set using the image processing mode setting key 102, a [foreground focused, background blur large], [foreground focused, background blur small], [foreground blur large, background focused], [foreground blur small, background focused], and [pan-focus] selections are displayed on the liquid crystal monitor 103, and the photographer selects the setting of a desired blur condition.

For example, in order to obtain the previously mentioned image 14, the [pan-focus] selection is set, and to obtain the previously mentioned image 15, the [foreground blur large, background focused] selection is set.

The present invention relates to the control of the blur condition of an final blur control image when generating the blur control image. In this case, "blur condition" is defined as the "blur magnitude" and "blur form." The "blur magnitude" is defined as the absolute value of "very blurred" and "slightly blurred." The "blur form" is defined as a form, e.g., "off-axis aberration", "cylindrical aberration" and the like.

Control of the [blur magnitude] in the present embodiment is described below.

Figure 4:
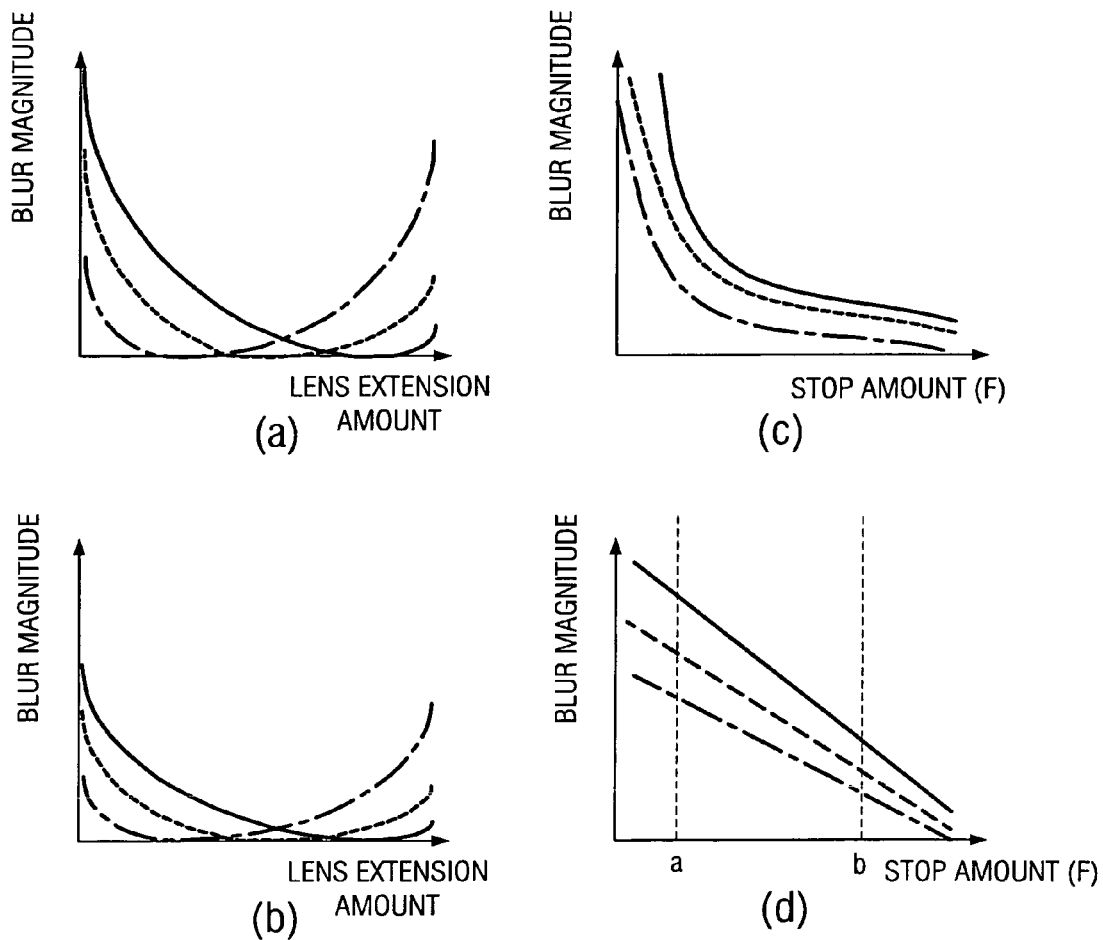
FIG. 4 illustrates the relationship between the blur magnitude and the lens extension amount and stop amount.

FIG. 4 parts a, b, c, d are illustrations representing the state of change on the "blur magnitude". FIG. 4 part a shows the "blur magnitude" relative to a "lens extension amount" (photographic distance) of the macro lens. In the drawing, the solid line, dotted line, and 1-dot chain line represent the relationship between "blur magnitude" and "lens extension amount" when object distances are different. In these curves, the lens extension amount when focused is a value intersecting the "lens extension amount" axis. The solid line represents when focused on an object at "close-up" distance; the 1-dot chain line represents when focused on an object rather distant; and the dotted line represents an intermediate relationship.

FIG. 4 part b similarly, shows the "blur magnitude" relative to a "lens extension amount (photographic distance)" when using a telephoto lens having a focal length of 22–80 mm. In this drawing also, the solid line, dotted line, and 1-dot chain line represent the relationship when object distances are different.

The "blur amount" determining these blur conditions is measured beforehand from the actual lens, and recorded in blur memory 50 described later, or on the previously mentioned recording medium 6. In the present invention, a blur control process (described later) is then executed using the "blur amount" measured and recorded beforehand.

Figure 5:
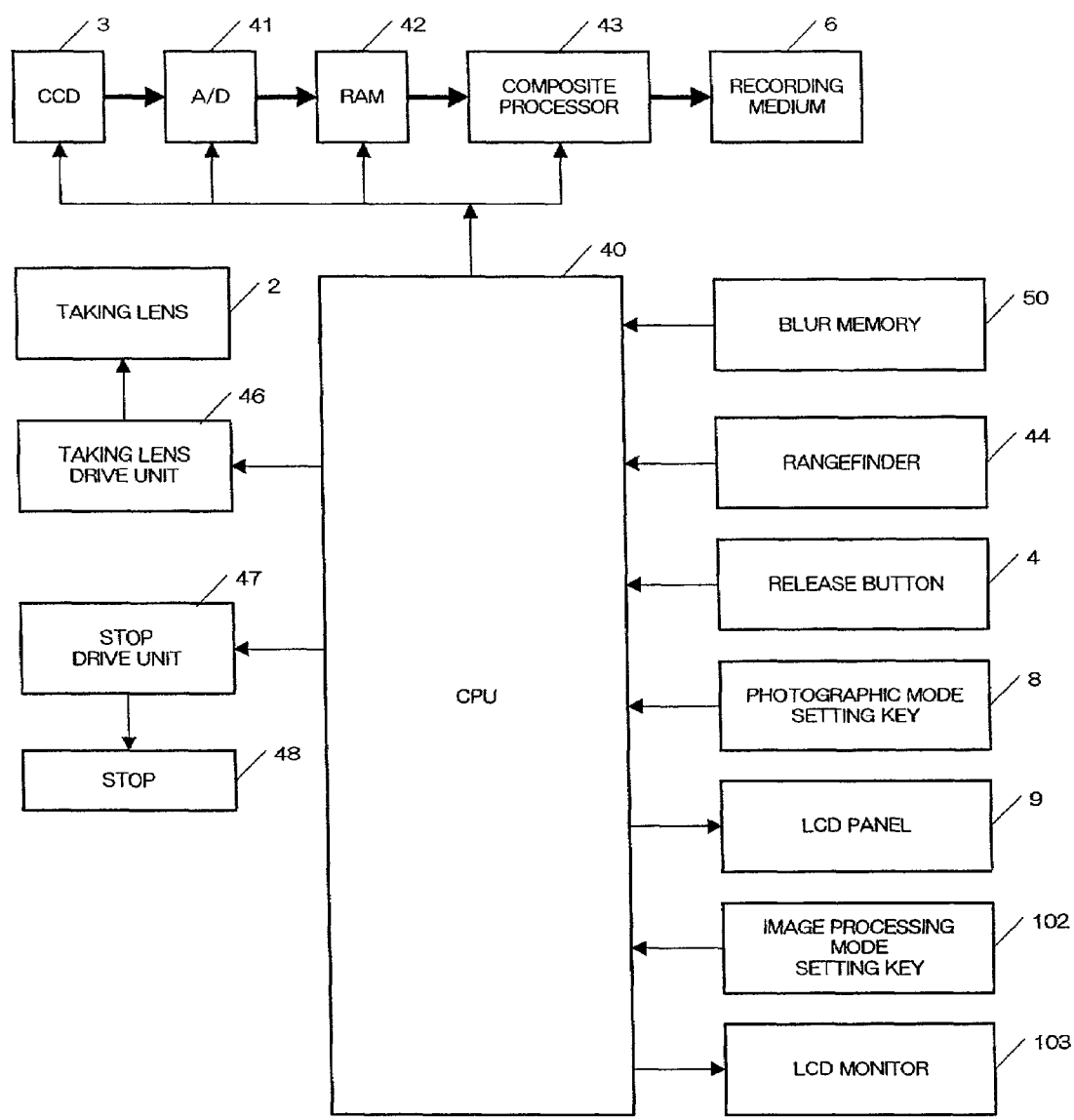
FIG. 5 is a block diagram showing the electrical structure of the digital camera.

FIG. 5 is a block diagram showing the electrical structure of the digital camera 1; the thin arrows indicate the flow of control data, and the thick arrows indicate the flow of image data.

Reference number 40 refers to a CPU; when the release button 4 is pressed, the set state of the photographic conditions, photographic mode setting key 8 setting and the like are recorded, and exposure conditions and the like are displayed on the liquid crystal display panel 9. Then, the CPU 40 drives the taking lens 2 so as to focus on a suitable object via a taking lens drive unit 46 based on measurement results from the rangefinder 44. The CPU 40 controls the stop 48 via a stop drive unit 47. The CPU 40 changes the amount of blurring of an image using the blur amount recorded on the blur memory 50 described later, or the previously mentioned recording medium 6. The CPU 40 changes the blur amount used depending on the photographic conditions, e.g., taking lens extension amount, stop amount, shutter speed, type of taking lens and the like. Moreover, the CPU 40 generally controls all of the digital camera 1.

Analog image signals from the CCD 3 are converted to digital image data by an A/D converter 41, and temporarily stored in an image memory (RAM) 42. The CPU 40 records image data read from the image memory (RAM) 42 on the recording medium 6.

A composite processor 43 generates an image from the plurality of images of different focal length corresponding to the setting content of the image processing mode from the pan-focus image and blur control image.

The blur memory 50 records the blur amount specifying the blur condition, and when the blur control mode is set, the composite processor 43 generates a blur control image in a specific blur condition based on a blur amount corresponding to the photographic conditions in conjunction with the control of the CPU 40.

Figure 6:
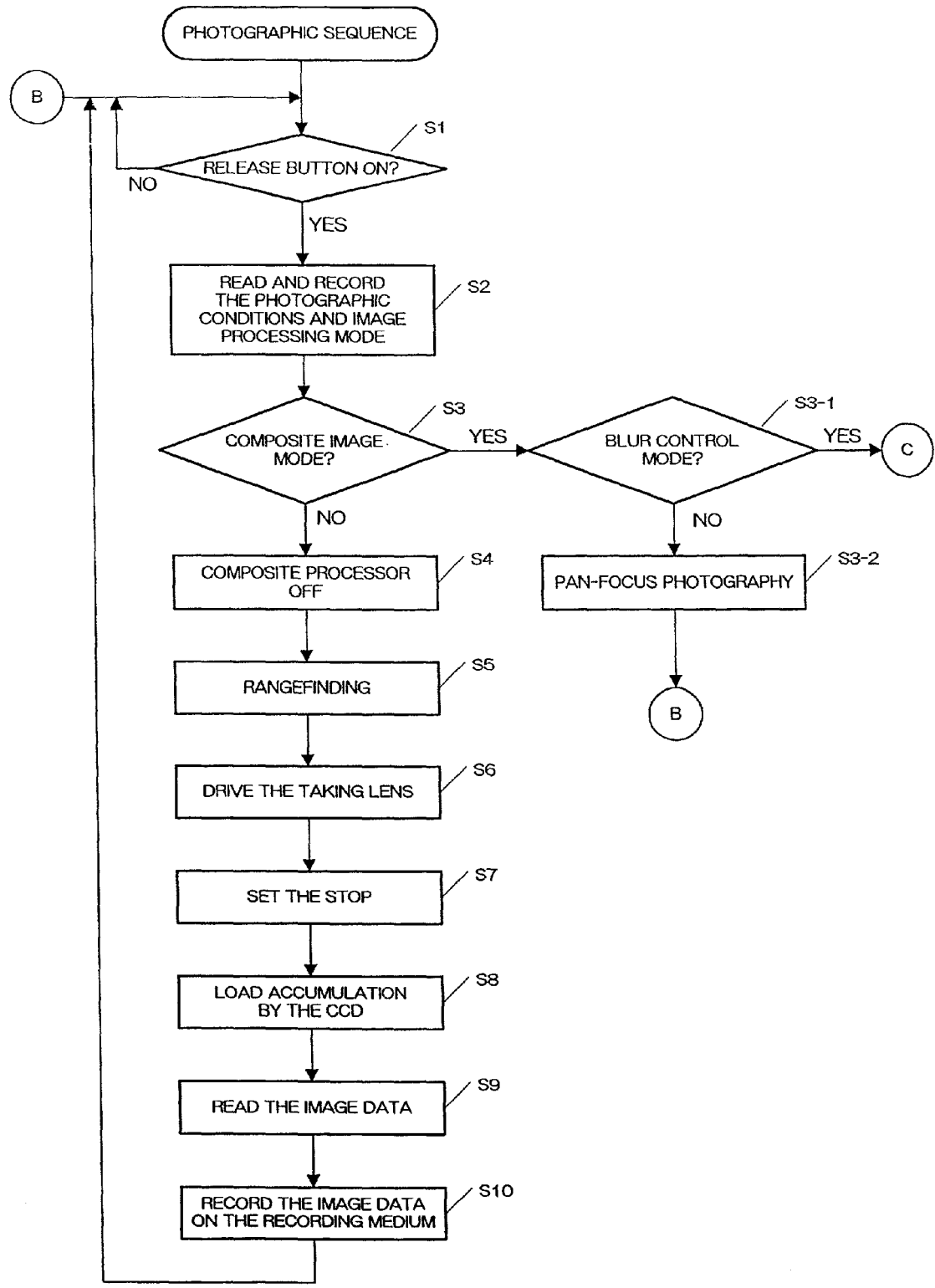
FIGS. 6 and 7 are a flow chart showing the operation of the digital camera.
Figure 7:
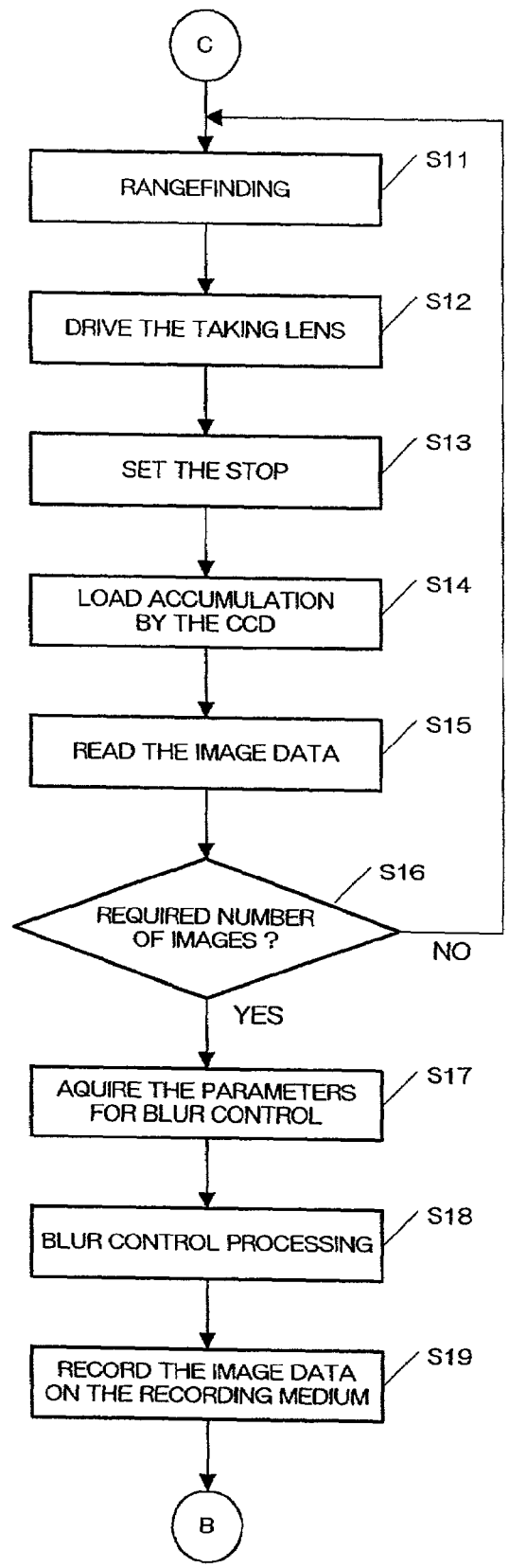

FIGS. 6 and 7 are a flow chart of the photographic sequence of the digital camera 1. In the following description and in the drawings, "step" is abbreviated to "S".

In S1, the CPU 40 determines whether or not the release button 4 has been pressed. When the release button 4 has been pressed (S1: YES), in S2, the CPU 40 reads and records the settings of the photographic conditions and image processing mode at that time. If the release button 4 has not been pressed (S1: NO), pressing of the release button 4 is awaited.

Then, in S3, the CPU 40 determines whether or not the composite image mode is set as the image processing mode. When the composite image mode is set (S3: YES), in S3-1, a determination is made as to whether or no the blur control mode is set, and when the blur control mode is set (S3-1: YES), the routine advances to S11 of FIG. 7. When the blur control mode is not set (S3-1: NO), in S3-2, pan-focus photography is executed and a pan-focus image is generated, then the routine returns to S1.

When the composite image mode is not set in S3 (S3: NO), in S4, the function of the composite processor 43 is set to OFF (i.e., image data are transmitted therethrough without composite processing).

In S5, the object distance is measured by the rangefinder 44. Then, in S6, the taking lens 2 is driven by the taking lens drive unit 46 based on the measurement result so as to focus on a suitable object. Then, in S7, the stop is set at a suitable value through the stop drive unit 47. Next, in S8, load accumulation by the CCD 3 is executed, and in S9, image data are read. The read image data are converted to digital image data by the A/D converter 41 via the pipeline method, and temporarily stored in RAM 42. The CPU 40 reads the image data from RAM 42, records the data on the recording medium 6, and the routine returns to S1 to move to the next photograph.

When the blur control mode is set in S3-1 (S3-1: YES), the object distance is measured by the rangefinder 44 in S1 similar to when the blur control mode is not set. Then, in S12, the taking lens 2 is driven via the taking lens drive unit 46 based on the measurement result so as to focus on a suitable object. Next, in S13, the stop is set at a suitable value by the stop drive unit 47. In S14, load accumulation by the CCD 3 is executed, and in S15, image data are read. The read image data are converted to digital image data by the A/D converter 41 via the pipeline method, and temporarily stored in RAM 42. In S16, the CPU 40 then checks whether or not the required number of images have been acquired; if the required number of images have not been acquired (S16: NO), the processes of S11~S15 are once again executed to acquire an image. The image this time is acquired by executing a photographic operation so as to focus on a different object than the object focused on last time.

When the required number of images have been acquired in S16 (S16: YES), in S17, the required parameters for blur control are acquired. These parameters are the "blur amount" of FIG. 4 stored in the blur memory 50, and the "blur condition" set by the user while viewing the liquid crystal monitor 103 using the image processing mode setting key 108. For example, when a user sets [foreground focused, background very blurred], the CPU 40 selects the "blur amount" for when an object is at infinity from the blur memory 50 based on the lens extension amount. Then, in S18, the composite processor 43 executed the blur control based on the parameter obtained in S17. In this way, the composite blur control image is recorded on the recording medium 6 in S19, and the routine returns to S1 to move to the next photograph.

At this time, the final combined image is displayed on the liquid crystal monitor 103, and whether or not this image is equivalent to a general "stop amount (F)" is also displayed. In this way, a user is made aware whether or not the composite image of the camera is equivalent to an image photographed under these photographic conditions.

The user can acquire an image having a desired "blur magnitude" in this way.

The above description pertains to a user setting an blur amount using the image processing mode setting key 102 and the liquid crystal monitor 103 in S17, however, such setting also may be made by operating the stop ring 49 and the like rather than the image processing mode setting key 102. In this case, the blur control process can be performed more intuitively.

The "blur amount" recorded in the blur memory 50 does not necessarily require the "blur amount" of the taking lens actually installed in the camera. If a user selects other lens data in S17, then an effect is obtained similar to the exchange of the lens without actually exchanging the taking lens 2.

Figure 8:
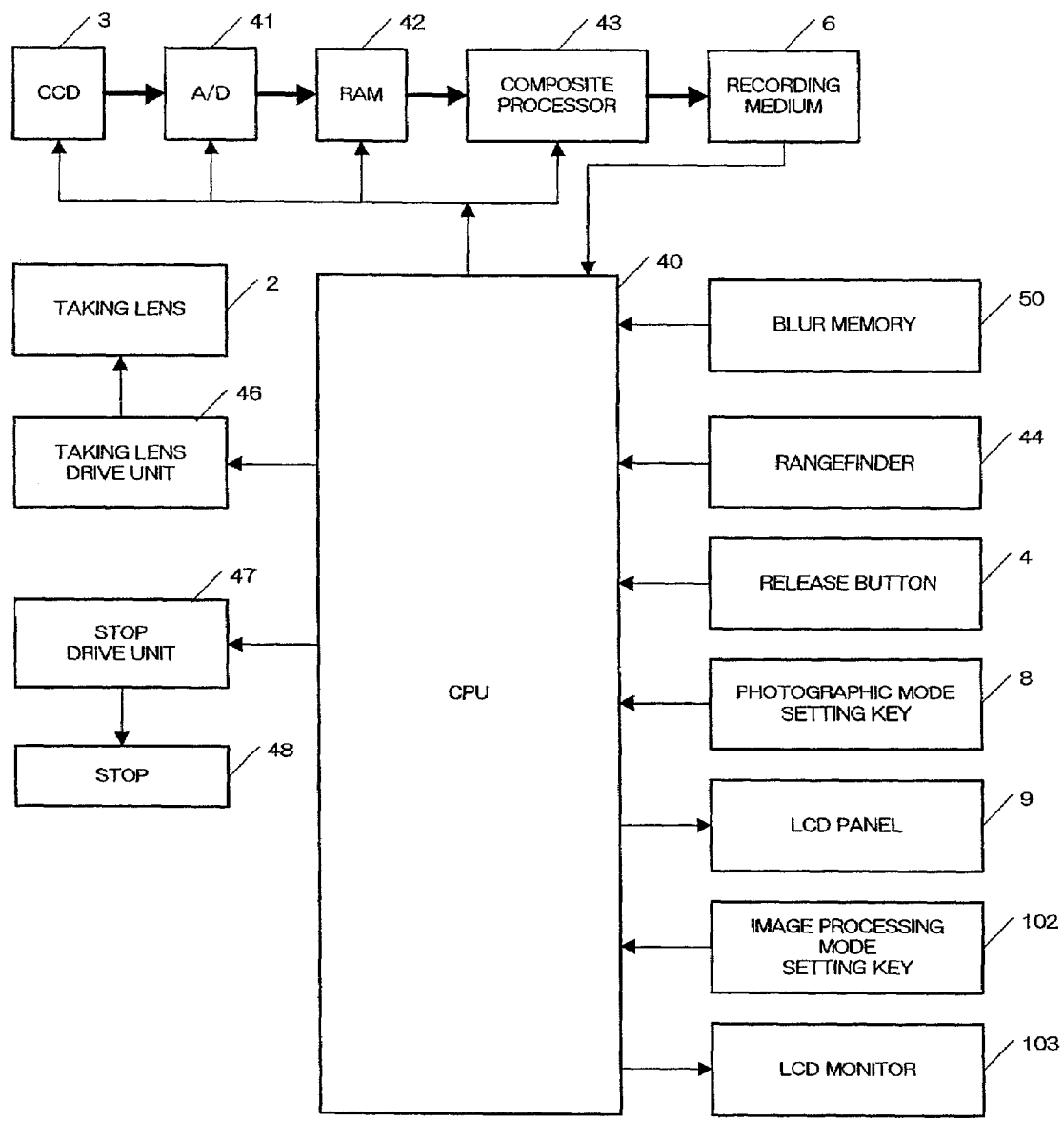
FIG. 8 is a block diagram showing the electrical structure of the digital camera of another embodiment.

In the above examples, the "blur amount" is recorded in the blur memory 50 within the camera, however, the "blur amount" may be recorded on the recording medium 6, and also recorded in the blur memory 50 as necessary. FIG. 8 is a block diagram when the "blur amount" is recorded on the recording medium 6. This block diagram differs from the block diagram of FIG. 5 in that arrows from the recording medium 6 to the CPU 40 are provided because the blur amount in the recording medium 6 is called by the CPU 40 and recorded in the blur memory 50.

The flow chart of the photographic sequence in this case is almost identical to that of FIGS. 6 and 7. A difference is that before entering the photographic sequence, a user selects an "blur amount" while viewing the liquid crystal monitor 103 via the image processing mode setting key 102, and the "blur amount" recorded on the recording medium 6 is copied to the blur memory 50. In this way blur amounts usable by a user can be increased without increasing the capacity of the blur memory 50 in the camera.

Although the preceding description has pertained to using the "lens extension amount" as a parameter for controlling the "blur magnitude," this parameter is not limited to the "lens extension amount." For example, the "stop amount" may be used as a parameter for controlling the "blur magnitude." FIG. 4 part c shows the relationship between "blur magnitude" and "stop amount (F)," and the solid line, dotted line, and 1-dot chain line represent the relationship when object distances are different, similar to FIG. 4 parts (a) and (b). Consider the following used as an example in the drawing. In general, in a digital camera, the depth of field is deeper than a silver halide film camera. When the lens is zoomed to the telephoto side, the background is relatively sharp even with the stop open. The digital camera automatically controls the "blur magnitude" in accordance with the stop amount (F) as per FIG. 4 part (c). By means of this control, the background can be cleanly gradated even in a digital camera.

Even when photographing in the stop priority mode, there is a limit to the stop amount due to the actual structure of the camera. The digital camera automatically sets the blur amount in consideration of the stop amount set by the user. An example of this is described below. FIG. 4 part (d) shows the relationship between "blur magnitude" and "stop amount (F)." In the drawing, the solid line, dotted line, and 1-dot chain line represent the relationship when object distances are different. In the drawing, photography is only possible in the range a–b due to the actual structure of the camera. However, the blur of stop amount (F) at which photography is actually impossible may be expressed by extension. In this way a stop amount is possible in a wider range than the stop amount determined from the structure of the camera.

Control of "blur form" is described below.

FIG. 9 parts (a), (b), (c) show the relationship between "lens extension amount" and the "parameter representing the blur form." In this drawing the solid line, dotted line, and 1-dot chain line represent the relationship when object distances are different. Parameters a0, a1, a2 representing the "blur form" are, for example, coefficients of the function (1) below.

$$y = a0 + a1 * x + a2 * x^2 \qquad (1)$$

Figure 10:
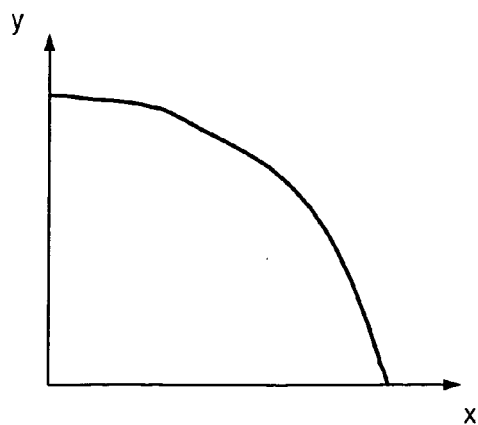
FIG. 10 is a curve representing equation (1).

The equation (1) produces the curve shown in FIG. 10 in the case of a specific object distance, and specific a0, a1, a2. This curve sets a rotating solid object as the "blur form" on the y axis. There are three parameters expressing the "blur form" designated a0, a1, a2. However, the number of parameters is not necessarily three, inasmuch as more, i.e., n parameters, may be used. Furthermore, "sin x" and "sin $x^2$" may be used instead of "x" and "$x^2$."

When the "blur form" can be selected, the flow chart of the photographic sequence and the block diagram of the digital camera 1 are similar to FIGS. 5, 6, and 7. However, slight differences are the recording of the data of FIG. 9 parts (a), (b), (c) in the blur memory 50, and the user-set blur condition in S17 as the "blur form."

In this way an image with user-desired "blur form" is obtained.

Furthermore, the "blur form" can be changed in accordance with the shutter speed. FIG. 9 parts (d), (e), (f) shows the relationship between "shutter speed" and the "parameter expressing the blur form." In this case, the description of "blur form" is identical to that of the relationship between the "lens extension amount" and the "parameter expressing the blur form" shown in FIG. 9 parts (a), (b), (c). That is, the data of FIG. 9 parts (d), (e), (f) are recorded in the blur memory 50. The flow chart of the photographic sequence in this case is identical to the flow chart of FIGS. 6 and 7.

Changing the "blur form" in accordance with the "shutter speed" is accomplished as described in the example below. A user may take a photograph in the shutter speed priority mode. However, there are times when, actually, the user cannot take a photograph using the user-set shutter speed value due to the exposure relationship. In such cases, the digital camera 1 automatically takes the photograph at an optimum shutter speed. When combining the images, the camera automatically corrects the blur condition to the blur condition of the user-set shutter speed. In this way the photograph is taken at an optimum shutter speed, and a photograph at the user-set shutter speed is obtained.

In the case of an RGB (red, green, blue) color image, the blur process is identical in RGB. In this case, an image is generated at separate blur conditions for each color component RGB, with enjoyable image effect.

As described above, the present invention increases the freedom of setting the blur condition by using an blur amount determined beforehand.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. An image capture device comprising:
   an image sensor for capturing an object image and generating an image data;
   a lens that directs the object image onto the image sensor;
   a first memory for storing the image data generated by the image sensor;
   a second memory for storing a predetermined blur amount as a function of a lens extension amount; and
   an image processor for changing a blur condition of the image data stored in the first memory according to the blur amount stored in the second memory.

2. The image capture device according to claim 1, wherein the image processor changes a magnitude of the blur of the image.

3. The image capture device according to claim 1, wherein the image processor changes a form of the blur of the image.

4. The image capture device according to claim 1, wherein the second memory stores blur amounts for a plurality of lenses.

5. The image capture device according to claim 1, wherein the second memory is a portable recording medium.

6. The image capture device according to claim 1, wherein the image processor changes the blur amount used in accordance with photographic conditions.

7. The image capture device according to claim 1, further comprises a stop ring for changing the blur amount.

8. The image capture device according to claim 1, wherein the configuration of the lens is the lens extension.

9. A method of image processing comprises the steps of:
   capturing an object image;
   generating an image data;
   storing the generated image data to a first memory;
   reading a predetermined blur amount from a second memory based on a lens extension amount used to capture the object image; and
   changing a blur condition of the image data stored in the first memory according to the blur amount read from the second memory.

10. The method according to claim 9, wherein the second memory stores blur amounts for a plurality of lens configurations.

11. The method according to claim 10, further comprising selecting one of the plurality of blur amounts, wherein reading a predetermined blur amount comprises reading the selected blur amount.

12. The method according to claim 11, wherein the selected blur amount corresponds to a lens used in capturing the image.

13. The method according to claim 9, wherein the configuration of the lens is the lens extension.

14. An image capture device comprising:
   an image sensor for capturing an object image and generating an image data;
   a lens that directs the object image onto the image sensor;
   a first memory for storing the image data generated by the image sensor;
   a second memory for storing a predetermined blur amount as a function of an aperture value; and
   an image processor for changing a blur condition of the image data stored in the first memory according to the blur amount stored in the second memory.

15. A method of image processing comprising the steps of:
   capturing an object image;
   generating an image data;
   storing the generated image data to a first memory;
   reading a predetermined blur amount from a second memory based on an aperture value used to capture the object image; and
   changing a blur condition of the image data stored in the first memory according to the blur amount read from the second memory.

* * * * *